(12) United States Patent
Mathiszik et al.

(10) Patent No.: US 7,675,816 B2
(45) Date of Patent: Mar. 9, 2010

(54) ENHANCED NOISE CANCELLATION IN VSP TYPE MEASUREMENTS

(75) Inventors: Holger Mathiszik, Wathlingen (DE); Graham A. Gaston, Neidersachsen (DE); Stephen McLaughlin, Edinburgh (GB)

(73) Assignee: Baker Hughes Incorporated, Houston, TX (US)

( * ) Notice: Subject to any disclaimer, the term of this patent is extended or adjusted under 35 U.S.C. 154(b) by 560 days.

(21) Appl. No.: 11/598,887

(22) Filed: Nov. 14, 2006

(65) Prior Publication Data
US 2007/0153628 A1    Jul. 5, 2007

Related U.S. Application Data

(60) Provisional application No. 60/737,706, filed on Nov. 17, 2005, provisional application No. 60/737,034, filed on Nov. 15, 2005.

(51) Int. Cl.
*G01V 1/00*       (2006.01)
(52) U.S. Cl. .......................................... 367/57; 702/14

(58) Field of Classification Search .................. 367/57; 702/14
See application file for complete search history.

(56) References Cited

U.S. PATENT DOCUMENTS

| 5,555,220 A | 9/1996 | Minto .......................... 367/86 |
| 2003/0144797 A1 | 7/2003 | Leaney ......................... 702/14 |
| 2004/0006430 A1* | 1/2004 | Harmon et al. ................ 702/14 |
| 2004/0122593 A1 | 6/2004 | Haldorsen ....................... 702/6 |
| 2005/0052949 A1 | 3/2005 | Gaston et al. |
| 2005/0162974 A1* | 7/2005 | Milkereit et al. .............. 367/57 |
| 2006/0203614 A1* | 9/2006 | Harmon ....................... 367/57 |

FOREIGN PATENT DOCUMENTS

| EP | 0239464 A2 | 9/1987 |
| EP | 1464991 A1 | 6/2004 |
| WO | WO0013043 | 3/2000 |

* cited by examiner

*Primary Examiner*—Mark Hellner
(74) *Attorney, Agent, or Firm*—Madan & Sriram, P.C.

(57) ABSTRACT

A method and system for acquiring seismic data while conducting drill string operations in a wellbore. The seismic receiver combination set comprises a combination of orthogonal geophones and accelerometers, and an array of hydrophones.

25 Claims, 5 Drawing Sheets

Figure 5

ENHANCED NOISE CANCELLATION IN VSP TYPE MEASUREMENTS

CROSS-REFERENCES TO RELATED APPLICATIONS

This patent application claims priority from U.S. Provisional Patent Application Ser. No. 60/737,706 filed on Nov. 17, 2005 and from U.S. Provisional Patent Application Ser. No. 60/737,034 filed on Nov. 15, 2005.

BACKGROUND OF THE INVENTION

1. Field of the Invention

The present invention is related to the field of geophysical exploration and more specifically to a method of receiving seismic signals on a drill string in a wellbore to acquire seismic data while drilling.

2. Description of the Related Art

In drilling a borehole to recover oil from the earth, it is often helpful to turn or steer the downhole drill bit toward or away from subterranean targets. To facilitate geophysical steering, drillers need to know drill bit location on the seismic section. The location of targets ahead of the bit is also required, as well as some warning or indication of drilling hazards such as over-pressured formations or thin, shallow gas intervals. Surface seismic surveys generally include this information, but resolution and depth location is poor because surface seismic surveys are time based (rather than depth based) and the low frequencies generally available are not conducive for high resolution. For example, to determine the depth of a reflection, a speed of sound for the earth formation must be known. Consequently, these systems require depth calibration to accurately determine locations of target horizons or drilling hazards. Traditionally, this calibration has been provided by either offset well sonic data or wireline checkshot data in the current well. Offset data is often inadequate however due to horizontal variations in stratigraphy between wells.

During surface seismic surveys, a plurality of seismic sources and seismic receivers are placed on the surface of the earth. The seismic sources are triggered in a predetermined sequence, resulting in the generation of seismic waves. These seismic waves travel downward through the earth until reflected off some underground object or change in rock formation. The reflected seismic waves then travel upward and are detected at the seismic receivers on the surface. One or more clocks at the surface measure the time from generation of the seismic waves at each source to the reception of the seismic waves at each receiver. This gives an indication of the depth of the detected object underground. However, the exact speed of sound for these seismic waves is unknown, and thus, the exact depth of the detected object is also unknown. To more closely measure the exact speed of sound, a "wireline checkshot" acquired during drilling operations may be used to calibrate depth measurements by measuring the transit times between seismic sources and seismic receivers. During a "wireline checkshot," a receiver on a "wireline" is lowered a known distance into an already-drilled borehole. A surface seismic source is then triggered and the time is measured for the seismic wave to travel to the wireline receiver. Because the depth of the wireline receiver is known, an average interval velocity indicating the average speed of the seismic wave can be determined with some degree of accuracy. Wireline checkshots, however, require interruption of the drilling operations by removing the drilling string out of the hole, commonly known as tripping, and so wireline checkshot surveys are often prohibitively expensive.

With Vertical Seismic Profiling (VSP), acquisition is conducted between one or more seismic sources on or near the surface of the earth, and receivers in the earth, for example in a wellbore. Measurements are acquired of the response of a seismic sensor (like a geophone) at various depths in a borehole to sources on the surface. Sometimes the surface sources are moved about the area as well. Where the source is an appreciable distance from the well head, the result is termed an offset VSP; this provides a way to seismically "look" to the side of the borehole in the vicinity around the adjacent earth formation. For an "azimuthal VSP," where the velocity field is sampled for azimuthal velocity changes relative to different lateral directions, sources are offset on the surface in different (i.e., various) directions from the borehole. In a walk-away VSP a surface source moves while the geophone in the borehole remains stationary; this provides another way to look to the side of the borehole. In a reverse VSP the source is in the borehole and geophones are on the surface. In a reverse VSP the noise generated by the drill bit during drilling operations may be used as a seismic source. VSPs are also acquired in directional and horizontal wells. A walk-above VSP is made with the sonde in a deviated hole and the source moved so as to be vertically above it. Many issues with VSP and other near borehole acoustic surveys concern the multiplicity of various types of background noise present in the environment that may substantially interfere with signal reception.

US patent application 20030144797 to Leaney discusses a method of performing the time picking step in a VSP (vertical seismic profile) survey. The time picking step is carried out on a combined three-component amplitude of the received seismic energy, which contains the amplitude of all the seismic energy received at the receiver. The amplitude of the direct pulse in the combined trace will not decrease to zero as the offset of the source is changed, as can be the case for the single-component amplitude of the direct pulse. In a particularly preferred embodiment of the invention, the combined three-component amplitude is calculated by summing the Hilbert instantaneous amplitudes of the x-, y- and components of the seismic data using the equation (I). The Leaney application also provides two new time picks. One time pick involves finding the maximum positive gradient of A(t). The other time pick entails extrapolating to A(t)=0 from the time at which A(t) has its greatest positive gradient, using the maximum positive gradient for the extrapolation.

US patent application 20040122593 to Haldorsen discloses a method of processing multi-component seismic measurement-while-drilling data that includes rotating the data to align energy in the data along a common axis and then combining the data. Another embodiment of the inventive method involves a technique for estimating the orientations and/or change in orientation of a bottom hole assembly associated with two or more series of multi-component seismic MWD data acquired at different times at the same source and receiver locations. Embodiments of the inventive method may be used to improve the signal to noise ratio of the data, to reduce downhole storage and transmission requirements, and to improve direct arrival time picks made using the data.

There is a need to acquire seismic data, both checkshot transit time and VSP data during drilling operations without the expense of interrupting and halting the drilling operations while enhancing the desired signal energy and suppressing the environmental noise energy. There is a need for a method and system of receiving accurate high resolution checkshot and VSP seismic data in the vicinity of the drilling string generally and the drill bit particularly without the need to halt drilling operations.

The methods of the present invention overcome the foregoing disadvantages of the prior art by providing a technique for deploying a wellbore seismic receiver in a drill string without the use of a wireline and acquiring seismic data as the drill string operations are conducted within the wellbore.

SUMMARY OF THE INVENTION

A method and system is provided for acquiring seismic data while conducting drill string operations in a wellbore. A seismic receiver combination set is conveyed in a drill string to a location of interest. The seismic receiver combination set comprises a combination of orthogonal geophones and accelerometers, and a circumferential array of hydrophones. Seismic signals, which may optionally be coded seismic signals, may be generated by a seismic source near a surface location; the seismic signals are detected with at at least one sensor in the seismic receiver at least one location of interest in the wellbore as the drill string is operated in the wellbore; an arrival time of the detected seismic signal is computed in the seismic receiver; the signal is enhanced due to the noise cancellation enabled by the receiver set combination; and the detected seismic signals or computed arrival times are stored in the seismic receiver combination set or transferred to the surface.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DETAILED DESCRIPTION OF THE INVENTION

For enhanced noise cancellation and signal detection in a VSP type measurement, a set of acoustic receivers of different types with different acoustic characteristics may be combined in one measurement. Such a combination set of acoustic receivers may comprise three orthogonally arranged geophones, plus three orthogonally arranged accelerometers, plus a circumferential array of hydrophones, or individual combinations of all. Due to their spatial alignment and due to the different acoustic characteristics of the different sensors, each sensor records the source signal with respect to the acoustic background noise in a different way. Due to the different sensitivities and physical characteristics, the individual recordings of the sensors are used to cancel out the background noise while enhancing the signal of interest. Data acquisition using different sensors in combination allows for better characterization of noise in a seismic while drilling (SWD) environment. This leads to suppression of pump noise and drillbit noise in the downhole environment.

Following this procedure, VSP type seismic signal events like first arrival times or boundary reflections can be determined. The general procedure is applicable while drilling, in a jointed pipe or coiled tubing environment, or on a wireline, to increase the signal-to-noise ratio.

Recognizing a single seismic event within a noisy environment, like that environment proximate to the well bore while drilling, may be difficult due to low signal to noise ratio of the seismic event. Surface emitted signals, like coded signals consisting of discrete timed events or frequencies, are easier to recognize using the present invention in the downhole conditions even given the losses and distortions due to the transit through the earth formations. Lower fundamental frequencies of a source waveform still retain the source generated recognizable pattern (whether a predetermined source pattern is used or not), allowing the downhole tool system to deduce the time of arrival of any given point. This source generated signal may be an arbitrary or shaped impulse or may be coded to contain information about the time of source ("Source Time") activation, thus enabling transit time calculation downhole as well as enabling determination of the absolute time of "first break arrival." First break picking may be carried out with only one sensor or component, e.g., a hydrophone. This "source time" may be used to synchronize the downhole and uphole (or near surface) clocks used in the acquisition system. The acquisition system thus has a self-check ability.

Figure 1:
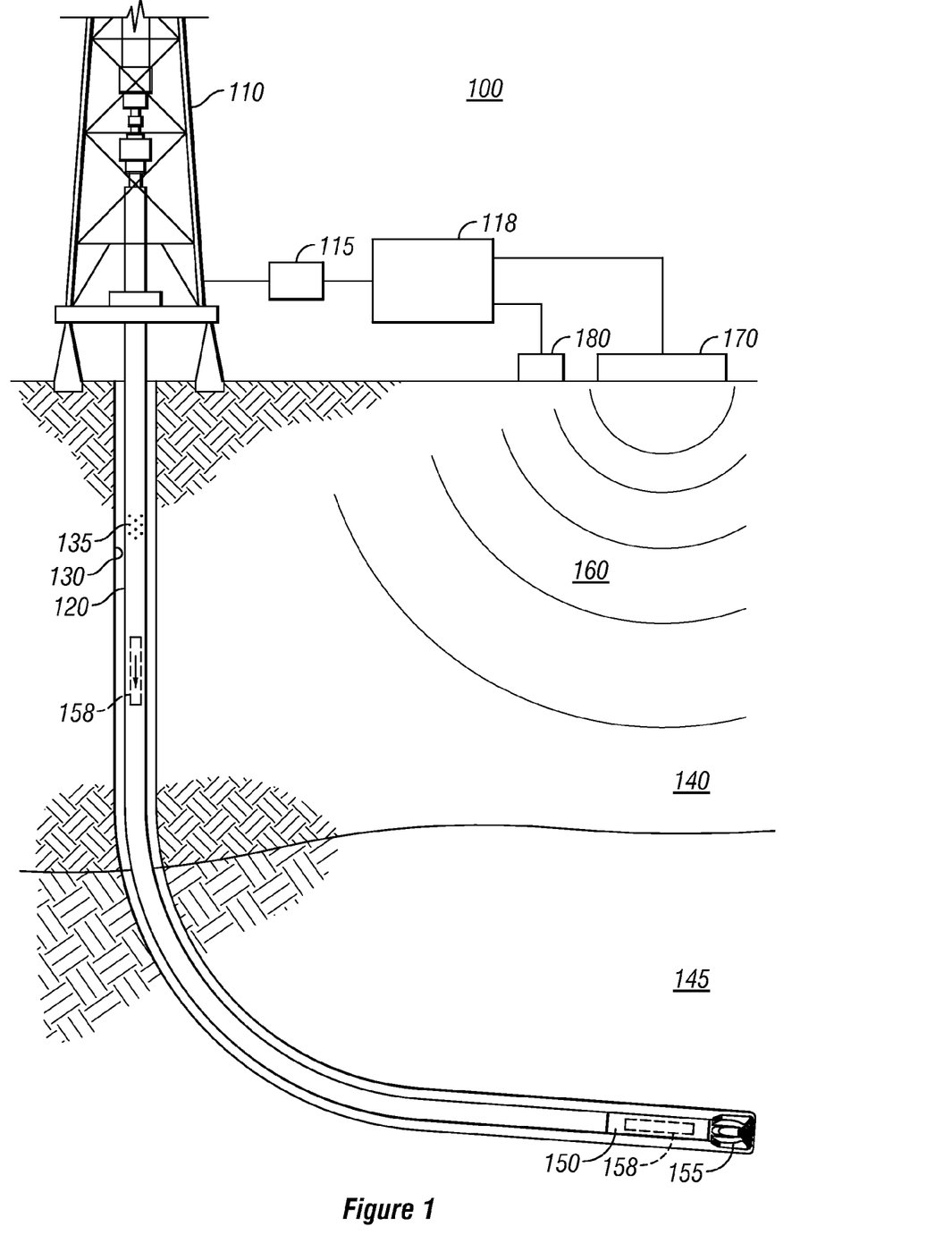
FIG. 1 is a schematic diagram of a seismic acquisition system for use in one embodiment of the present invention.

Referring to FIG. 1, a system 100 according to the present invention includes a derrick 110 with an attached drillstring 120. A drill bit 155 creates a well bore 130 through the surrounding formation 140, which may also include formation boundaries corresponding to, for example, an over-pressurized zone 145. A transducer apparatus, which may be a seismic receiver combination set 158 with an appropriate combination of seismic sensors is inserted into the drillstring 120 and is located at a drill string receiver installation position 150, which installation position may be near the drill bit 155 or at other positions along the drill string. The seismic receiver combination set 158 receives seismic signals 160 from a seismic source 170. The seismic source 170 may be an impulsive energy sequence generator or mechanical vibrator, located at the surface. The use of a particular source is exemplary only, as the system may be either land or marine-based, and is not seismic source-type specific. For example, an offshore system may include an air gun array or marine vibrator, either hung from an offshore platform or located near a service boat or anchored buoy.

The seismic source 170 contains the facility to generate and emit arbitrary signals, shaped waveforms and/or well-defined source patterns or specifically coded source signals. Examples of coded source signals suitable for emission from the surface to the downhole receiver during drilling operations include timed discrete event sequences and timed discrete event frequencies. Coded source signals are easier to recognize (i.e. to seismically separate the received signal from the drilling noise) in the downhole conditions while drilling even given the losses and distortions due to the transit through the earth formations and noise associated with drilling operations. Coded source signals provide suitable signals that may be processed in a downhole seismic receiver to provide seismic signal transit times (e.g., checkshot) from the surface source location to the downhole seismic receiver. Lower fundamental frequencies still retain the recognizable patterns (whether predetermined or not) allowing the downhole tool to deduce the time of arrival of any given point on the pattern. This pattern may be arbitrary or contain information about the time of source activation ("Source Time"), thus enabling transit time calculation downhole as well as absolute time of "first break arrival". This "source time" may be used to synchronize the downhole and uphole clocks used in the measurement system. This allows the system a self-check ability. The seismic source 170 thus provides a suitable quality source signal that may be used both for vertical seismic profiling and for checkshot acquisition contemporaneous with active drilling operations.

Also located at the surface is a depth indicator 115 to measure the depth positions of the drill string (or drillstring) 120 and so to ascertain the depth of components on the drill string. A depth indicator may be placed in the BHA as well, and able to transmit depth information to the surface. The depth indicator signals are transmitted to a surface controller 118 where they may be time stamped and stored in memory. The surface controller 118 is connected to the seismic source 170 for controlling the generation of seismic signals. The actual connection between the controller 118 and the seismic source 170 can be hardwired, can be radio telemetry or any other suitable communication system. Surface controller 118 contains circuitry, processing capability, and memory storage, and functions according to programmed instructions to control the generation of coded or patterned seismic signals. The surface controller circuitry contains a real-time clock for time coding the transmitted source signal. A near-field sensor 180 of any appropriate type (for receiving electromagnetic, acoustic or mechanical signals) is located near the source 170 and is used to record the acoustic signature of the source 170; the same or an alternative sensor may be used as well to receive any communication emitted from the downhole seismic receiver. The output of sensor 180 is transmitted to the surface controller 118 where it is time stamped and stored in memory. For example, the sensor 180 can receive and store the downhole-computed data or other information from downhole systems, for example the checkshot or source to seismic receiver transit time. The memory used for storing data in the surface processor or downhole seismic receiver may be internal random access memory, magnetic storage, optical storage, or any combination of these.

Figure 2:
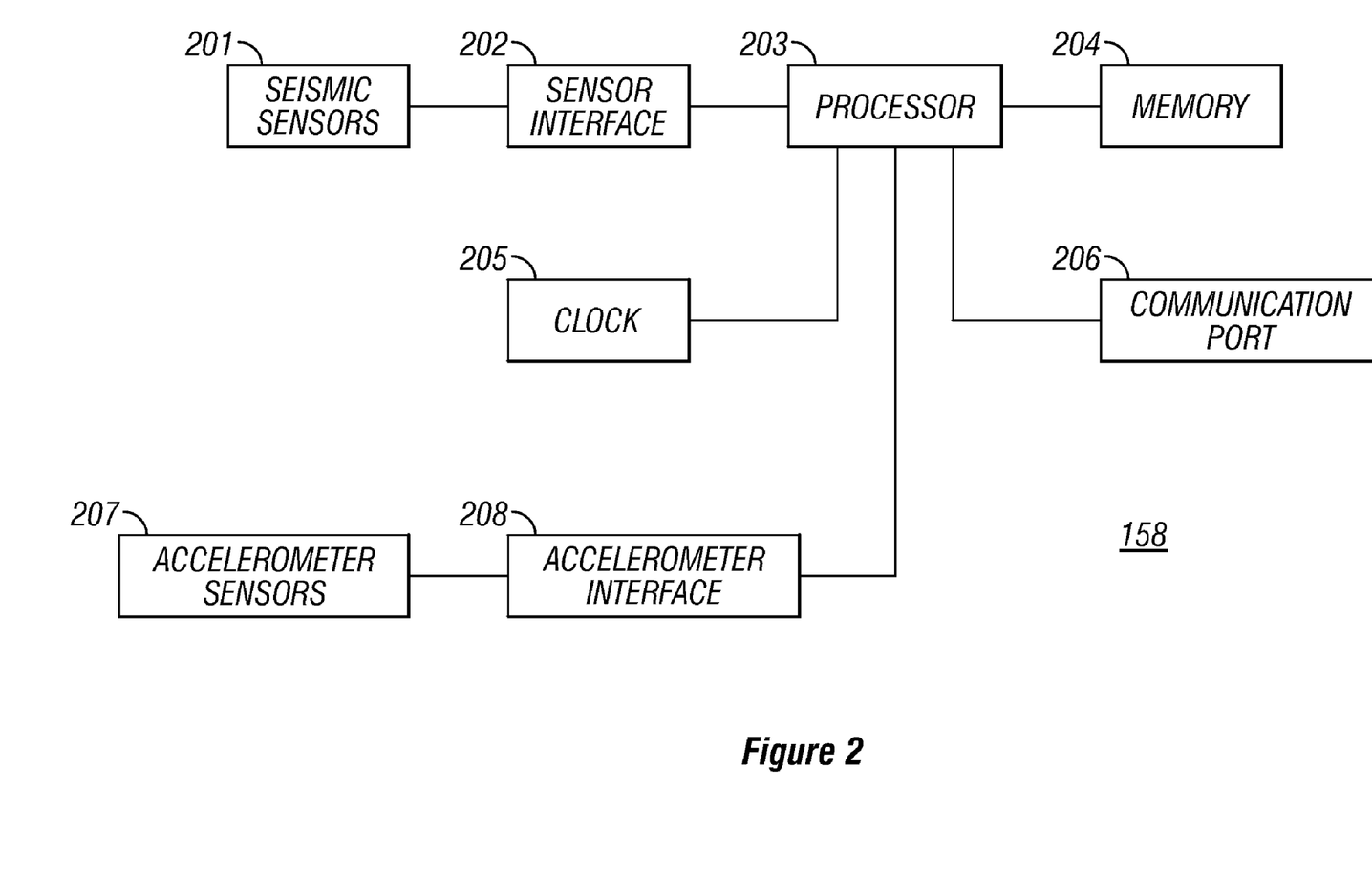
FIG. 2 is a block diagram of a seismic receiver for use in one embodiment of the present invention.

Referring to FIG. 2, the (downhole) seismic receiver set 158 (the 'seismic receiver combination set') may comprise a combination of sensors 201 such as hydrophones, accelerometers and geophones. Any other acoustic or seismic sensor could be used, e.g., micromechanical accelerometers (MEMS devices), fiberoptical sensors, etc. The seismic receiver combination set 158 may comprise seismic sensors 201 including three orthogonally arranged geophones, plus three orthogonally arranged accelerometers, plus a circumferential array of hydrophones, or individual combinations of all of these. The seismic receiver combination set 158 apparatus also includes suitable sensor interface circuitry 202, a processor 203, and memory 204 for storage of programmed instructions and storage of received seismic data. A real time clock circuit 205 is also included in the receiver set 158 to provide time stamps for the received seismic signals. The surface located real-time clock and the seismic receiver located real-time clock 205 are synchronized at the surface before deploying the seismic receiver set 158 into the wellbore 130 or into the drill string 120. A communications port 206 can be included to download program instructions to memory 204 and to upload stored seismic data to a surface system such as surface processor 118. The receiver set 158 may be powered by batteries (not shown) or other energy source (e.g., fuel cells, downhole generator, wireline, etc.). A similar seismic receiver that is deployable by slick-line is described in U.S. Pat. No. 5,555,220 to Minto, assigned to the assignee of this application and incorporated herein by reference. While seismic receiver combination set 158 is illustrated in FIG. 1 at two positions within a drill string, the location and number of deployments are flexible.

Figure 3:
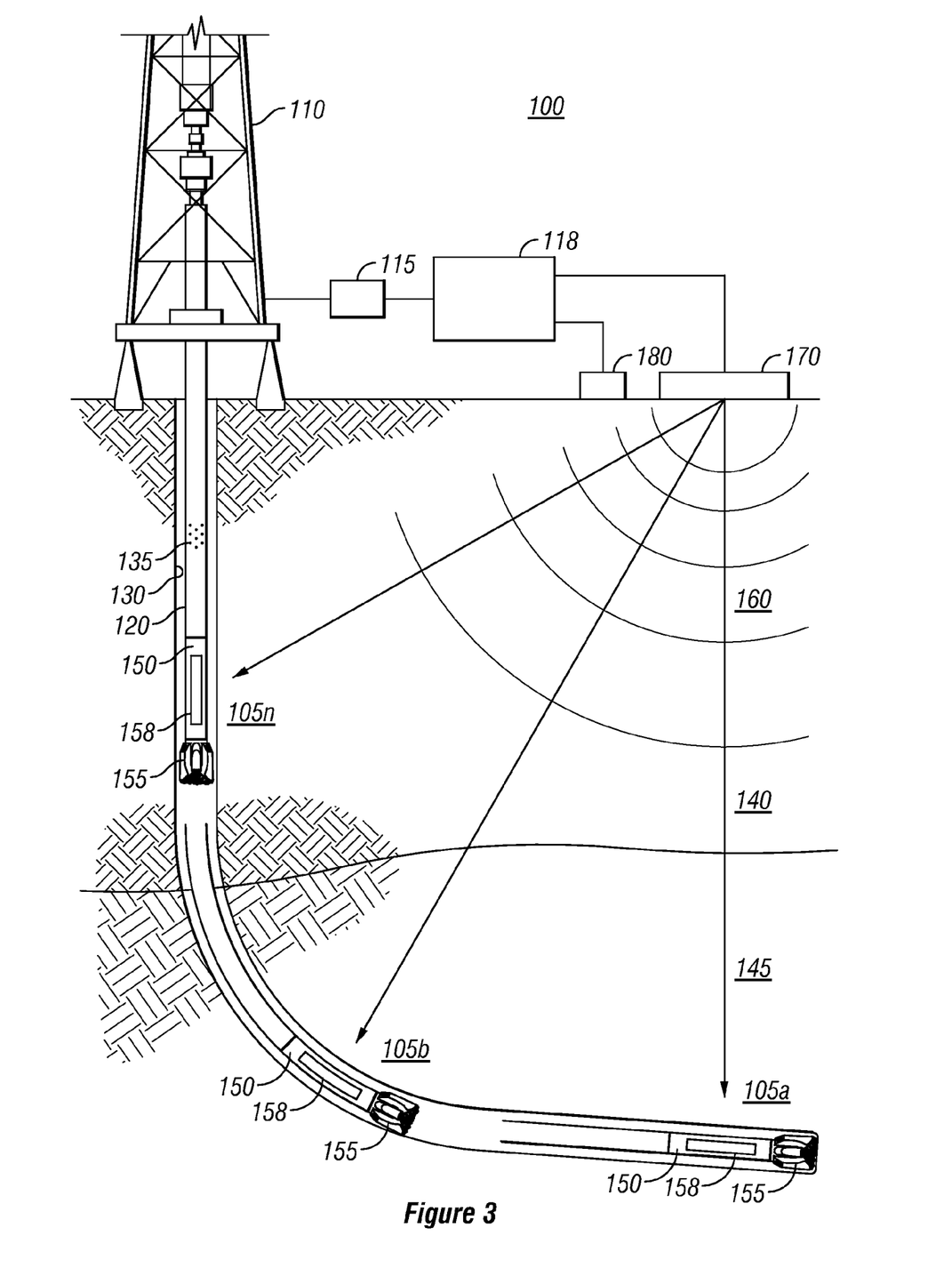
FIG. 3 is a schematic of a seismic acquisition system for use in one embodiment of the present invention.

In operation, shown in FIG. 3, the seismic receiver combination set has been deployed in the drill string 120 and may be located at position 105a. The seismic receiver combination set 158 can be programmed at the surface to turn on the seismic receiving sensors 201 after a predetermined time delay. The time delay may be operator selected to allow receiver set 158 to reach a predetermined location before activating the seismic sensors 201. Alternatively, the time delays are selected for operational convenience. Or, communication protocols known in the art for use to communicate with downhole tools may be used to activate the seismic receiver according to specific instructions from the operator. After the programmed time delay, the surface processor 118 is initiated to begin to cycle the surface source 170 generating seismic signals 160 at predetermined intervals. The interval between signals can be selected, depending on receiver depth, in order to prevent overlap of successive signals.

Sensors of varying physical assembly and characteristics may be used to record the same physical event, which in this case may be the arrival of seismic energy propagating from a surface source into the wellbore. Due to their various recording behaviors, each sensor type detects the signal of interest at substantially the same time but with different waveforms, amplitudes, and background noise. For example, hydrophones are pressure devices and therefore quite sensitive to fluid guided waves, e.g. tube waves, which may be considered as noise in a seismic borehole measurement. So the hydrophone output may be considered as a noise level which needs to be eliminated from other sensor type signals, e.g. geophones or accelerometers. So correlating the different sensor traces enables cancellation of noise and the identification of signals of interest. This procedure is applicable to data acquired while drilling with jointed pipes or coiled tubing systems, or on wireline.

The present invention provides sets of seismic sensors wherein the sensor sets are different in their physical assembly and recording characteristics to record a seismic event. An example of a seismic event for this case is the arrival of seismic energy propagating from a surface source into the wellbore. The seismic sensor sets may comprise three orthogonally arranged geophones (for 'velocity' measurements), plus three orthogonally arranged accelerometers, plus a circumferential array of hydrophones, or individual combinations of all of these.

Due to their different recording behavior each sensor type detects the signal of interest at the same time but with different waveforms, amplitudes, and background noise. Transducers which are generally referred to as 'geophones' ordinarily respond to at least one of the dynamic variables displacement, velocity or acceleration in response to a passing seismic wave. Geophones are commonly considered to record the velocity component of seismic waves, which is the case for geophones that measure frequencies above the natural frequency of the geophone. Below the natural frequency of the geophone, the output will be proportional to frequency and so to the acceleration of the passing seismic wave. However, for the purposes of this disclosure, geophones measure velocity while accelerometers measure accelerations. The present invention provides for three-component geophones such that velocities are measured in three orthogonal directions. However, a particular sensor type may be selected for its response with a certain characteristic for a particular dedicated direction. For example, a geophone may be chosen for an x-direction, an accelerometer for a y-direction and both deployed with an omnidirectional hydrophone.

An accelerometer is a transducer with an output that is proportional to acceleration. The present invention provides for three-component accelerometers such that accelerations are measured in three orthogonal directions. Three component arrangements (for geophones and accelerometers) are beneficial for accurate acquisition over a wide range of offsets and azimuths. Three component recordings potentially acquire the full seismic wavefield rather than only one component. Data processing results are enhanced due to full wavefield sampling, the characterization of seismic velocity anisotropy, and beneficial handling of near-surface signal attenuation.

Hydrophone seismic receivers are pressure devices and therefore quite sensitive to fluid guided waves, e.g. tube waves. Tube waves are considered as noise in a seismic borehole measurement. Hydrophones are detectors that are sensitive to variations in pressure, as opposed to a geophone which is generally sensitive to particle motion. Some hydrophones operate by magnetostriction and others are piezoelectric. The sensing element may be a piezoelectric ceramic material such as barium titanate, lead zirconate, or lead metaniobate. Piezoelectric hydrophones are high-impedance devices and signals may be passed through preamplifiers or impedance-match transformers before transmission to the recording instruments.

Hydrophone outputs provide information for reference noise levels for consideration that may be suppressed or eliminated from other sensor type signals, e.g. the orthogonal geophones and accelerometers. Correlating and comparing the different sensor output traces enables characterization, filtering and/or cancellation of noise and therefore enables identification and enhancement of signals of interest.

The method, system and apparatus of the present invention may be applied while drilling with jointed pipes or coiled tubing systems operations. The present invention may also be practiced with wireline operations.

Figure 4:
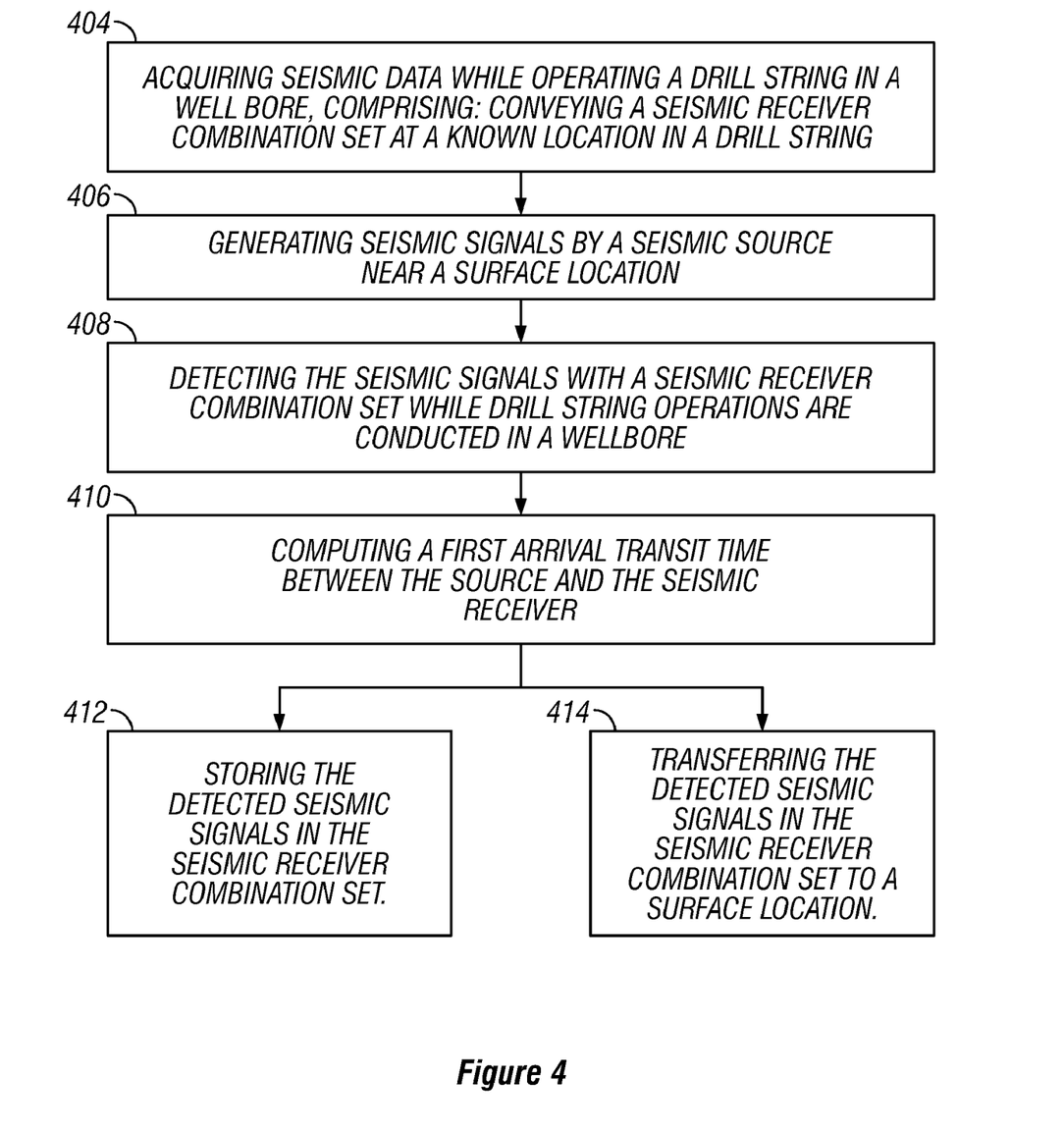
FIG. 4 is a flow chart that illustrates the method and system of the present invention.

An embodiment of the method of the present invention provides for acquiring seismic data while conducting drilling operation in a wellbore as is illustrated in FIG. 4: conveying a seismic receiver combination set (158) installed at a position in a drill string 404; optionally generating signals, which may be coded signals, by a seismic source near a surface location 406; detecting the seismic signals with the transducers of the seismic receiver combination set at least one location in the wellbore 408; and computing (which may includes correlating, filtering and other processing), using the data acquired with the seismic receiver combination set 410, at least a transit time for the detected seismic signals. Optionally, the method comprises storing the computed time 412 in the downhole transducer apparatus 158 and/or transmitting the computed arrival time to a surface location 414. The coded seismic signals may comprise timed discrete events or frequencies. A plurality of seismic receiver combination sets may be disposed along the drill string. The receiver sets may comprise orthogonal geophones, orthogonal accelerometers and hydrophones. The coded signal may be recorded with near source sensors 180 and stored to memory in a processing unit. Acquired data may be stored to memory in the seismic receiver combination set apparatus 158 and the data sent to the surface processor during drilling operations or subsequently after the drill string is removed from the wellbore. The checkshot data and VSP may be used to generate maps of subsurface features.

In another embodiment provided by the present invention, the receiver combination set 158 of FIG. 2 is programmed to acquire data samples during predetermined time windows selected by the operator. The seismic receiver combination set 158 may be incorporated into the drill string system as part of a non-rotating sleeve device. The surface processor may be programmed to transmit coded seismic signals during these predetermined time windows. The predetermined time windows are selected to correlate with operational activities so that the sampling time windows will occur at desired sample locations or during predetermined times in the wellbore. The operator can alter operations of the drill string during these windows to provide a relatively low noise environment for the sets of seismic sensors 201. The receiver processor 203 samples, time stamps, and stores the detected signals during data acquisition in memory 204. Detected signals may be processed, formed into seismic records (410 of FIG. 4) such as checkshot transit times or VSP data, stored into memory, and/or compressed and transmitted back to the surface sensor 180 as illustrated in FIG. 4, 412, 414. Data acquisition may occur during normal drilling operations or the drill string may be stopped or otherwise operationally altered for data acquisition. The drill string may be stopped at predetermined locations in the wellbore 130 such as location 105b, 105n and the drill string 120 held stationary during the time sample windows predetermined for seismic acquisition. While three locations of interest are illustrated as examples in FIG. 3, any number of locations of interest may be chosen. The surface processor 118 cycles the source 170 activation during each sample window. The near-field sensor 180 detects each generated source signal and transmits the detected signal to the surface processor 118 where it is time stamped and stored in memory in the surface processor 118. At the end of the drilling process, the seismic receiver combination set 158 is retrieved from the drill string receiver installation position 150. The time-stamped seismic signals are transmitted via the communications port 206 to the surface processor where they are processed with the near-field signals and the depth data, according to techniques known in the art, to provide data for an improved seismic map of the downhole formation.

In still another embodiment, the seismic receiver combination set 158 apparatus has at least one accelerometer 207 mounted in or near each seismic receiver combination set 158 to sense movement of the drill string 120, see FIG. 2. Signals from accelerometer 207 are conditioned by interface circuits 208 and fed to processor 203. Accelerometer 207 may be powered continuously from the time the seismic receiver combination set 158 is inserted into the wellbore until the receiver is returned to the surface after the seismic data acquisition process. Alternatively, one or more accelerometers (of the combination of transducers in 201) in seismic receiver combination set 158 may be used to sense movement of the drill string 120. These accelerometer signals may be used to switch the seismic data acquisition receiving cycle on and off in seismic receiver combination set 158. When the drill string 120 is positioned at a location where it is desirable to acquire seismic data, such as 105a, 105b, and 105n in FIG. 3, the drill string 120 may be held stationary at the surface, or drilling operations may continue uninterrupted depending on operational considerations. The accelerometer 207 generated signals are used by the processor 203 to determine drill-string position or that the drill-string 120 has stopped moving if prior to initiating the acquisition of seismic data. The processor is preprogrammed to receive and store data for a predetermined period of time sufficient to receive coded source signals. The source 170 is activated as described above and data are taken and stored from the near-field sensor 180 and the depth sensor 115 as described previously. As before, the downhole received and stored data is transferred to the surface processor 118 when the seismic receiver combination set 158 is returned to the surface.

In yet another preferred embodiment, an acoustic source (not shown) is coupled to the drill-string 120 at the surface. The acoustic source transmits a coded signal through the drill-string 120 that is detected and decoded by the seismic receiver combination set 158. The coded signal can be used to initiate the taking of data by the receiver set 158. Such acoustic systems are known in the art and are not discussed here further.

Another embodiment of the method of the present invention provides for acquiring seismic data while drilling a well, comprising: conveying at least one seismic receiver combination set system installed in a drill string; generating coded signals by a seismic source near a surface location; detecting the seismic signals with at least one sensor in the seismic receiver combination set at least one location in the wellbore; and storing the detected seismic signals in the seismic receiver combination set apparatus.

Figure 5:
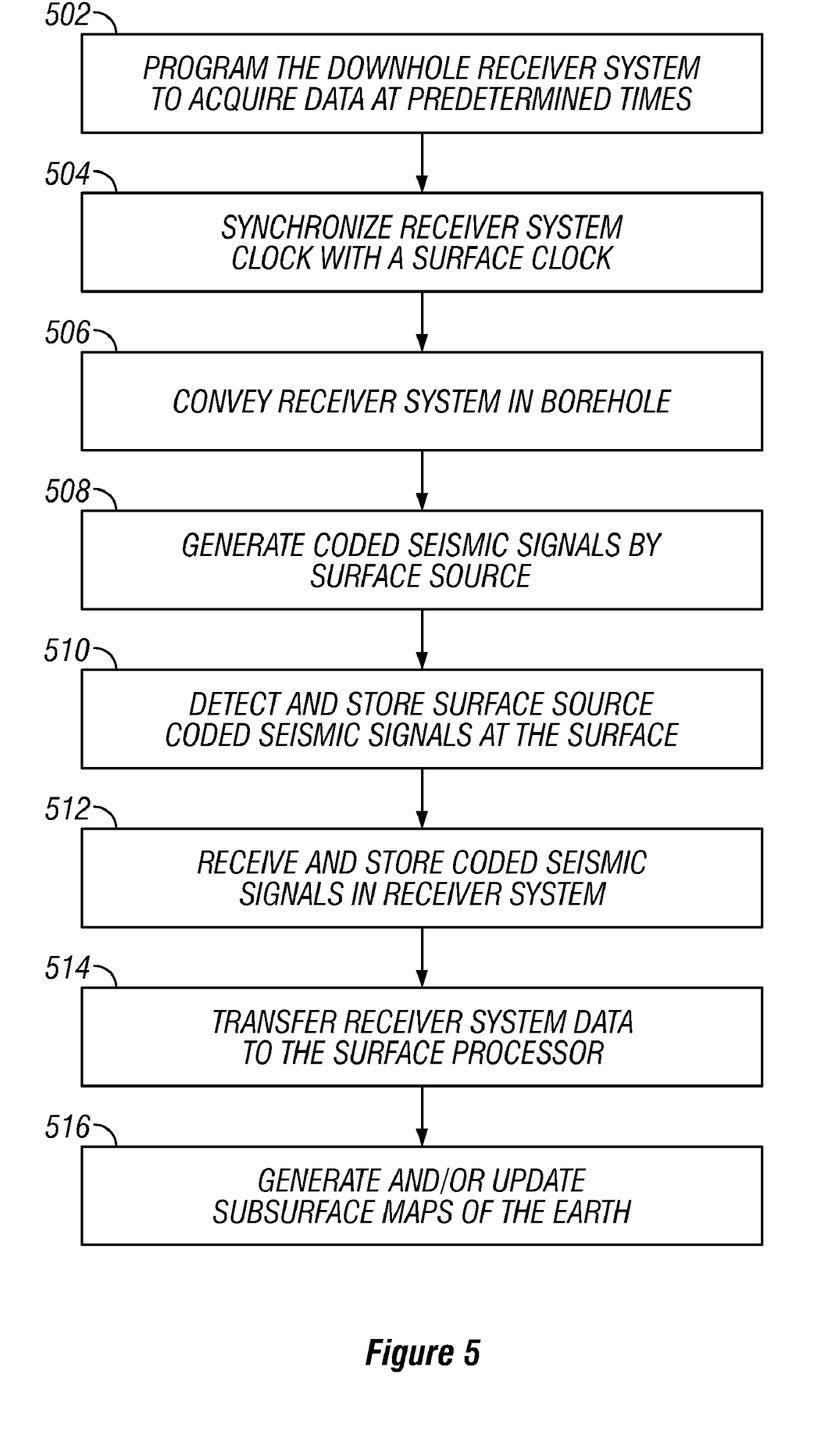
FIG. 5 is an alternative flow chart that illustrates the method and system provided by the present invention.

An alternative method of and system for acquiring seismic data during drill operations is illustrated in FIG. 5 and comprises: programming the seismic receiver combination set system 158 of FIG. 2 at the surface 502 to enable acquisition during predetermined time intervals, to acquire data during a predetermined time, and/or to activate the acquisition process at predetermined times where the predetermined times correlate to locations of interest for taking seismic data; synchronizing a surface clock in the surface processor with a downhole clock in the seismic receiver combination set system (158) 504; conveying the seismic receiver combination set system 158 at locations along the drill string 506; generating coded seismic signals under control of the surface processor at the predetermined times correlating with the locations of interest of the seismic receiver as drilling operations are conducted in the wellbore 508; the coded signals may contain timing information and operational instructions; detecting the generated seismic signals by a near-source sensor and storing the detected signals and drill-string depth information in the surface processor 510; receiving and storing the generated seismic signals 512 from the surface with the seismic receiver system 158; the received signals may be correlated in real time in the downhole seismic receiver at the locations of interest as the receiver is conveyed along the wellbore and seismic data transit times through earth formations determined; transferring the seismic receiver data or determined transit times to the surface processor 514; the data may be transferred when the receiver system 158 is removed from the wellbore, or the system 158 may otherwise affect transmission to the surface, for example through port 206; and generating updated seismic maps of the formations surrounding the wellbore 516.

Another embodiment of the invention is a machine-readable medium that includes instructions for a method of computed an arrival time of detected seismic signals. Based on the instructions, measurements made with a seismic receiver combination set installed in a drill string conveyed in a wellbore. The instructions may enable use of the determined distance for generating a seismic map. The machine readable medium may include ROMs, EAROMs, EPROMs, EEPROMs, flash memories and optical disks.

The present invention provides a methods and systems for acquiring seismic data while: 1) drilling a well, 2) running a wireline operation, or 3) acquiring data with a permanent downhole acquisition installation. These embodiments comprise: conveying into a wellbore a seismic receiver combination set installed in a drill string; generating seismic signals at a surface location; detecting the seismic signals with the seismic receiver combination set at at least one location in the wellbore; and computing an arrival time for the detected seismic signals in the seismic receiver combination set. The method provides for the seismic receiver combination set comprising at least one set of orthogonal geophones, at least one set of orthogonal accelerometers and a circumferential array of hydrophones. Generating seismic signals at a surface location further comprises generating coded seismic signals. Computed arrival times may be transferred to the surface processor. Computed arrival times may be stored in the seismic receiver combination set. Coded seismic signals may comprise timed discrete events or timed discrete frequencies. A plurality of seismic receiver combination sets may be located along the drill string. The seismic signal may be detected with at least one sensor located at the surface and may be stored by the sensor in a surface processor. Signals stored in the seismic receiver combination set may be transferred to the surface processor upon removal of the drill string from the wellbore. The acquired data or surface detected signals may be processed according to programmed instructions to generate a seismic map.

The present invention provides a methods and systems for acquiring seismic data while: 1) drilling a well, 2) running a wireline operation, or 3) acquiring data with a permanent downhole acquisition installation. These embodiments comprise: conveying into a wellbore at least one seismic receiver combination set installed in a drill string; generating coded seismic signals by a seismic source near a surface location; detecting the seismic signals with at least one seismic receiver combination set at least one location in the wellbore; computing, in the seismic receiver combination set, a checkshot transit time for the detected seismic signals; and transferring said checkshot transit time to the surface.

Alternatively, the present invention provides a methods and systems for acquiring seismic data while: 1) running a drill string in a well, 2) running a wireline operation in a well, or 3) acquiring data with a permanent downhole acquisition installation. These embodiments comprise: synchronizing, at the surface, a surface clock in a surface controller with a downhole clock in a seismic receiver combination set; programming, at the surface, a processor in the seismic receiver combination set to activate during at least one predetermined time window after a predetermined delay time, conveying the seismic receiver combination set in the drill string to a location of interest in the wellbore; generating, under control of a surface processor, coded seismic signals by a seismic source near a surface location; detecting the generated seismic source signals with a near-source sensor and storing said signals in the surface processor; detecting the seismic signals with at least one seismic receiver combination set at a location of interest in the wellbore; storing the detected seismic signals in the seismic receiver combination set; transferring the detected seismic signals from the seismic receiver combination set to the surface processor; and processing the near-source signals and the seismic receiver combination set detected signals according to programmed instructions to generate a seismic map.

In still another embodiment the present invention provides a methods and systems for acquiring seismic data while: 1) drilling a well, 2) running a wireline operation, or 3) acquiring data with a permanent downhole acquisition installation. These embodiments comprise: a surface seismic source for generating coded seismic signals; a seismic receiver combination set installed in a drill string conveyed in a bore hole, said seismic receiver combination set comprising sensors for detecting said coded seismic signals; and said seismic receiver combination set enabled to compute an arrival time for a detected seismic signal. The seismic receiver combination set may be enabled to transfer the computed arrival time to the surface processor. The computed arrival time may be stored in the seismic receiver combination set. The coded seismic signals may further comprise timed discrete events or frequencies. The system may comprise a plurality of seismic receiver combination sets located along the drill string for detecting seismic signals at a plurality of locations. At least one surface sensor may be located at the surface for detecting a coded seismic signal as well as a processor for storing the signal detected by the at least one surface sensor.

Alternatively in another embodiment the present invention provides a methods and systems for acquiring seismic data while: 1) drilling a well, 2) running a wireline operation, or 3) acquiring data with a permanent downhole acquisition installation. These embodiments comprise: a surface seismic source for generating coded seismic signals; a seismic receiver combination set installed in a drill string to be conveyed in a bore hole, said seismic receiver comprising a sensor for detecting said generated coded seismic signals; and the seismic receiver combination set is enabled to compute a checkshot transit time for a detected seismic signal.

The foregoing description is directed to embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method for acquiring seismic data, comprising;
conveying a seismic receiver combination set in a wellbore, the seismic receiver combination set comprising a plurality of receivers;
generating seismic signals at a first location;
detecting the seismic signals with the plurality of receivers in the seismic receiver combination set at least one location in the wellbore, at least one of the plurality of receivers having a different acoustic characteristic than another of the plurality of receivers;
computing an arrival time for the detected seismic signals in the seismic receiver combination set using a signal in one of the plurality of receivers to provide a parameter for processing of another of the plurality of receivers; and
generating a seismic map from the detected seismic signals.

2. The method of claim one wherein the first location is a surface location.

3. The method of claim 1 wherein the seismic receiver combination set further comprises at least one set of orthogonal geophones, at least one set of orthogonal accelerometers and a circumferential array of hydrophones.

4. The method of claim 1 wherein generating seismic signals at the first location further comprises generating coded seismic signals.

5. The method of claim 4 wherein said coded seismic signals further comprise at least one selected from the list consisting of i) timed discrete events, and ii) timed discrete frequencies.

6. The method of claim 1 wherein said computed arrival time is transferred to a surface processor.

7. The method of claim 1 wherein said computed arrival time is stored in the seismic receiver combination set.

8. The method of claim 1 further comprising using a plurality of seismic receiver combination sets located along the wellbore to detect seismic signals at a plurality of locations.

9. The method of claim 1 further comprising:
detecting the seismic signal with at least one near-source sensor located at the surface; and
storing the signal detected by the at least one near-source sensor in a surface processor.

10. The method of claim 9 further comprising processing, according to programmed instructions, the near-source detected signals and the seismic receiver combination set detected signals to generate a seismic map.

11. The method of claim 1 wherein the seismic receiver combination set is conveyed on a drillstring, the method further comprising transferring the signals stored in the seismic receiver combination set to a surface processor upon removal of the drill string from the wellbore.

12. The method of claim 1 further comprising synchronizing a surface clock in a surface controller with a downhole clock in the seismic receiver combination set.

13. The method of claim 1 further comprising programming, at the surface, a processor in the seismic receiver combination set to activate during at least one predetermined time window after a predetermined delay time.

14. A system for acquiring seismic data at a well, comprising;
a seismic source configured to generate coded seismic signals; and
a seismic receiver combination set installed conveyed in a bore hole, said seismic receiver combination set comprising a plurality of sensors configured to detect the coded seismic signals, at least one of the plurality of sensors having a different acoustic characteristic than another of the plurality of sensors; and
at least one processor configured to compute an arrival time for the detected seismic signals using a signal in one of the plurality of sensors to provide a parameter for processing of another of the plurality of sensors.

15. This system of claim 14 wherein the seismic source is positioned at a surface location.

16. The system of claim 14 wherein the seismic receiver combination set further comprises at least one set of orthogonal geophones, at least one set of orthogonal accelerometers and a circumferential array of hydrophones.

17. The system of claim 14 wherein said seismic receiver combination set is configured to transfer the computed arrival time to a surface processor.

18. The system of claim 14 wherein the seismic receiver combination set is configured to store the computed arrival time.

19. The system of claim 14 wherein said coded seismic signals further comprise timed discrete events.

20. The system of claim 14 wherein said coded seismic signals further comprise timed discrete frequencies.

21. The system of claim 14 further comprising a plurality of seismic receivers located along the wellbore configured to detect seismic signals at a plurality of locations.

22. The system of claim 14 further comprising at least one sensor located at the surface configured to detect a coded seismic signal and a processor configured to store the signal detected by the at least one surface sensor.

23. The system of claim 14 wherein the seismic receiver combination set further comprises a processor set to activate during at least one predetermined time window after a predetermined time delay.

24. A computer-readable medium product having stored thereon instructions which when read by at least one processor cause the at least one processor to perform a method, the method comprising:

using seismic signals detected at a plurality of sensors of a seismic receiver combination set conveyed in a wellbore in response to coded seismic signals generated at a surface seismic source, at least one of the plurality of sensors having a different acoustic characteristic than another of the plurality of sensors for:

computing an arrival time for the detected seismic signals wherein the computing is based at least in part on using a signal in one of the plurality of sensors to provide a parameter for processing of another of the plurality of sensors; and generating a seismic map from the detected seismic signals.

25. The computer-readable medium of claim 24 further comprising at least one of (i) a ROM, (ii) an EAROM, (iii) an EPROM, (iv) an EEPROM, (v) a flash memory, and (vi) an optical disk.

* * * * *